(12) United States Patent
Waltz, Jr.

(10) Patent No.: US 7,497,027 B2
(45) Date of Patent: Mar. 3, 2009

(54) RADIUS MEASURING TOOL

(76) Inventor: Stanley J. Waltz, Jr., 806 E. North Ave., Spokane, WA (US) 99207

( * ) Notice: Subject to any disclaimer, the term of this patent is extended or adjusted under 35 U.S.C. 154(b) by 0 days.

(21) Appl. No.: 11/881,762

(22) Filed: Jul. 30, 2007

(65) Prior Publication Data

US 2009/0031574 A1  Feb. 5, 2009

(51) Int. Cl.
*G01B 3/38* (2006.01)

(52) U.S. Cl. .................... 33/555.3; 33/555.1

(58) Field of Classification Search ..... 33/555.1–555.3, 33/534–537, 813, 833, 679.1, 1 SP, 1 R
See application file for complete search history.

(56) References Cited

U.S. PATENT DOCUMENTS

| | | | | |
|---|---|---|---|---|
| 181,809 A | * | 9/1876 | Williams | 33/555.3 |
| 878,439 A | * | 2/1908 | Wagniere | 33/555.3 |
| 1,506,618 A | * | 8/1924 | Durham | 33/201 |
| 2,362,907 A | * | 11/1944 | Levin | 33/494 |
| 2,603,872 A | * | 7/1952 | Jones | 33/1 R |
| 2,640,273 A | * | 6/1953 | Larson et al. | 33/555.1 |
| 3,754,335 A | * | 8/1973 | Culbertson | 33/555.3 |
| 5,611,149 A | * | 3/1997 | Fujiwara | 33/833 |

* cited by examiner

*Primary Examiner*—G. Bradley Bennett
*Assistant Examiner*—Amy Cohen Johnson
(74) *Attorney, Agent, or Firm*—Bergman & Jeckle PLLC

(57) ABSTRACT

A tool for measuring an object having a circularly curved surface provides a generally rectilinear body defining a V notch having two converging sides meeting at an apex and an angulated wedge track. A wedge movable along the wedge track and across the V notch intersects a bisector of the V notch at an angle other than perpendicular. Sides of the V notch and a measuring edge of the wedge simultaneously contact the circular curve at three equally spaced apart positions along the circumference of the circular curve. Measuring indicia on the body adjacent the wedge track allows determination of the lateral movement of the wedge along the wedge track. The distance the wedge moves on the wedge track is equal to the radius of the circular curve.

2 Claims, 4 Drawing Sheets

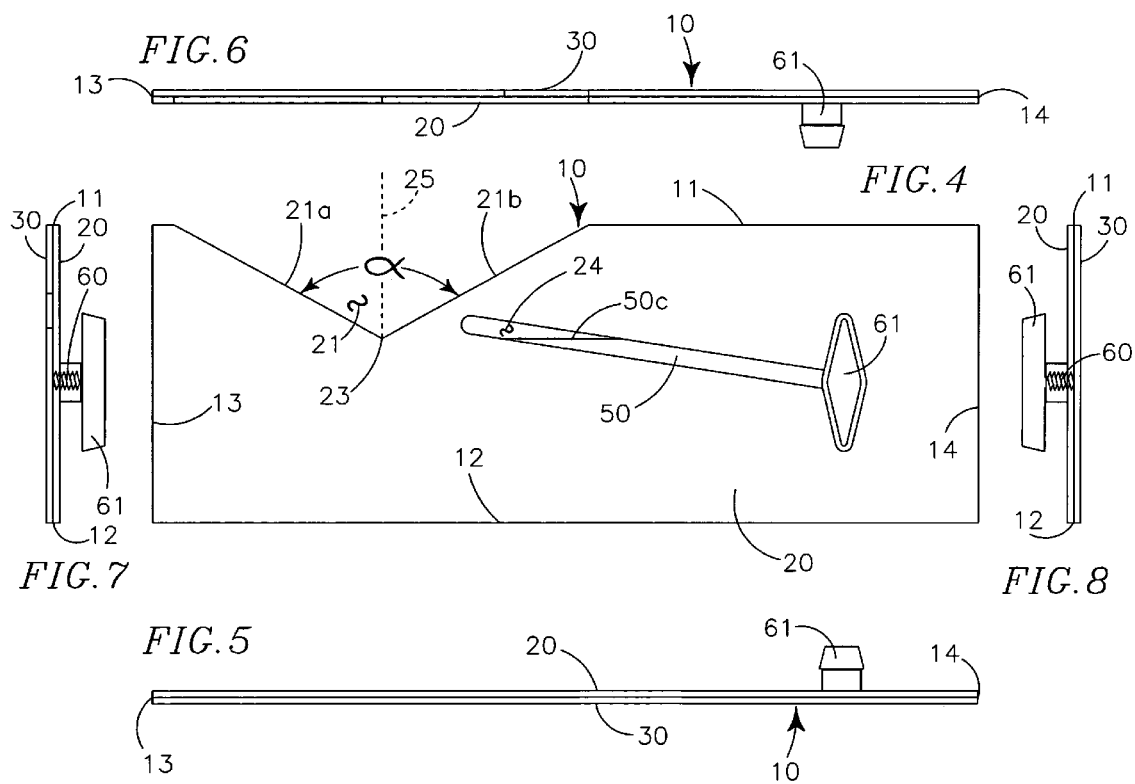

RADIUS MEASURING TOOL

RELATED APPLICATIONS

There are no applications related hereto heretofore filed in this or in any foreign country.

FIELD OF INVENTION

This invention relates to geometrical instruments, and more particularly to tools for measuring the radius of a circular curve.

BACKGROUND AND DESCRIPTION OF PRIOR ART

The radius of curvature of an article is commonly measured by direct measurement of the article's diameter, using a micrometer or similar device. Such devices typically measure the distance between two components contacting the article on diametrically opposing sides, using either mechanical or electronic means. The measured distance is then divided in half to provide the radius of the article.

While this method can be accurate, it requires simultaneous access to opposing sides of the article which may not always be accessible. For example, partially buried pipes do not normally permit access to opposing sides of the pipe, and measuring an inventory of tubular stock is often hampered by the lack of access to opposing sides of the tubular stock. Further, not all curves are completely cylindrical in cross-section, but rather may be partial curves such as at the intersection of two planar surfaces.

Various diameter and radius measuring tools are available, but they are generally complex, difficult to use and require conversion tables or calculations to generate a useable measurement. The majority of such tools are "Y" shaped devices that have a base and a yoke formed by two angularly diverging legs that have a 60 degree angle therebetween. A movable probe-bisects the angle and extends outwardly from the base into the area defined by the yoke. A curve to be measured is positioned in the yoke so the legs simultaneously contact the curve at two spaced apart positions. Thereafter the probe is moved outwardly from the base until it contacts the curved surface between the two contact points. The distance the probe moves between the base and the curved surface, plus the radius being measured is the hypotenuse of a right triangle. Because the angles are known, the radius and diameter of the curve can be calculated using known trigonometric formulas.

Yoke type radius measuring devices have disadvantages as well. First, such devices are almost universally constructed using a 60 degree angle because the sine of 30 degrees is 0.5 which leads to simple mathematical calculations. Unfortunately, such devices are unable to measure many articles because the curve to be measured will not fit within the yoke. Yoke type devices defining notches greater than about 60 degrees are not conducive to probe movement and when the probe movement is minimal, an accurate measurement may not be possible. Such minimal probe travel from the base to the curve requires that any delineations between measuring indicia on the probe be closely spaced leading to difficult reading and interpretation. Such minimal movement also necessitates frequent recalibration of the probe position relative to the base to maintain device accuracy. Further, yoke type devices often require an operator to perform mathematical calculations to convert the distance the probe moves into a usable measurement.

What is needed is a device for measuring a circular curve without requiring access to diametrically opposite sides of the article or the article's cross-section, a device with sufficient probe movement to provide an accurate measurement and a device that provides a usable measurement without resorting to conversion tables or calculators.

The present invention provides such a device and resolves various of the aforementioned drawbacks.

My radius measuring tool provides a user friendly device that directly measures the radius of circular curves without accessing diametrically opposed sides of the article, without a need for conversation tables, without calculations and without needing frequent recalibrations. My radius measuring tool has improved accuracy because the probe moves across the V notch rather than bisecting the notch which leads to increased travel and increased accuracy. Further, my radius measuring tool operates on the principle that actual movement of the probe relative to a fixed zero point is equal to the radius of the measured circular curve.

My invention does not reside in any one of the identified features individually but rather in the synergistic combination of all of its structures, which give rise to the functions necessarily flowing therefrom as hereinafter specified and claimed.

SUMMARY

A tool for measuring the radius of a circularly curved surface provides a generally rectilinear body defining a V notch having an apex and an angulated wedge track spacedly adjacent the apex. A wedge movable along the wedge track and across the V notch intersects a bisector of the V notch at an angle. Opposing angulated sides of the V notch and a measuring edge of the wedge simultaneously contact the circumference of the circular curve at three equally spaced apart positions. Measuring indicia on the body adjacent the wedge track allows determination of the movement of the wedge along the wedge track. The distance the wedge moves is equal to the radius of the circular curve.

In providing such an apparatus it is:

a principal object to provide a radius measuring tool wherein movement of a wedge from a fixed point is equal to the radius of the measured circular curve.

a further object to provide a radius measuring tool wherein movement of a wedge from a fixed point correlates to the radius of the measured circular curve.

a further object to provide a radius measuring tool that provides precise and accurate measurement of the radius of a curve.

a further object to provide a radius measuring tool that does not require calculations or use of conversion tables to obtain a radial measurement.

a further object to provide such a radius measuring tool that assists in replication of curvilinear bends.

a further object to provide such a radius measuring tool that does not need to be recalibrated after each measurement.

a further object to provide such a radius measuring tool that is user friendly.

a further object to provide such a radius measuring tool that is capable of measuring the radius of rounded corners.

a further object to provide such a radius measuring tool the accuracy of which can be increased with the increasing of the angle of the V notch.

a still further object to provide such a radius measuring tool that is of new and novel design, of rugged and durable nature, of simple and economic manufacture and one that is otherwise well suited to the uses and purposes for which it is intended.

Other and further objects of my invention will appear from the following specification and accompanying drawings which form a part hereof. In carrying out the objects of my invention it is to be understood that its structures and features are susceptible to change in design and arrangement with only one preferred and practical embodiment of the best known mode being illustrated in the accompanying drawings and specified as is required.

BRIEF DESCRIPTIONS OF DRAWINGS

In the accompanying drawings which form a part hereof and wherein like numbers refer to similar parts throughout:

FIG. 4 is an enlarged orthographic back view of the radius measuring tool of FIG. 1.

FIG. 5 is an orthographic bottom view of the radius measuring tool of FIG. 4.

FIG. 6 is an orthographic top view of the radius measuring tool of FIG. 4.

FIG. 7 is an orthographic partial cross sectional view of the first end of the radius measuring tool of FIG. 4 showing the threaded stud and the threaded fastener engaged therewith.

FIG. 8 is an orthographic partial cross sectional view of the second end of the radius measuring tool of FIG. 4 showing the threaded stud and the threaded fastener engaged therewith.

DESCRIPTION OF PREFERRED EMBODIMENT

Figure 1:
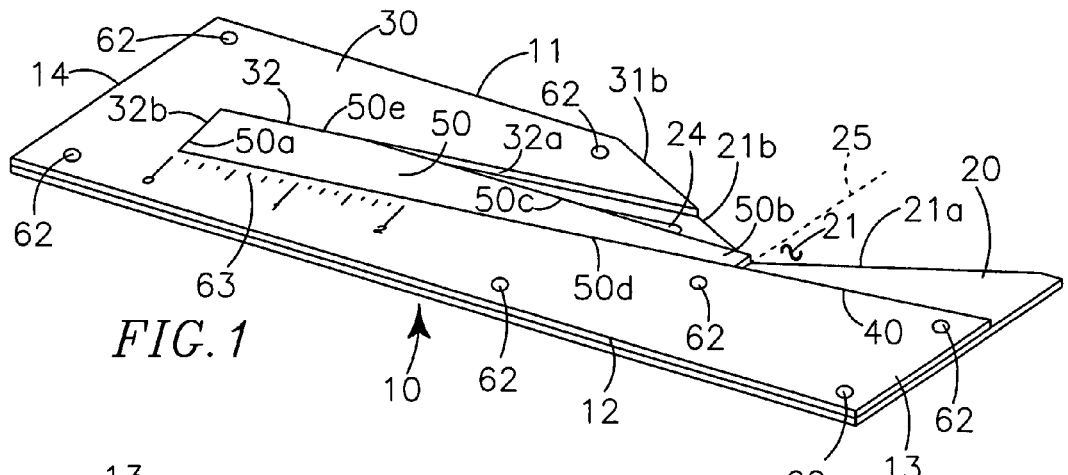
FIG. 1 is an isometric front, bottom and first end view of my radius measuring tool.
Figure 2:
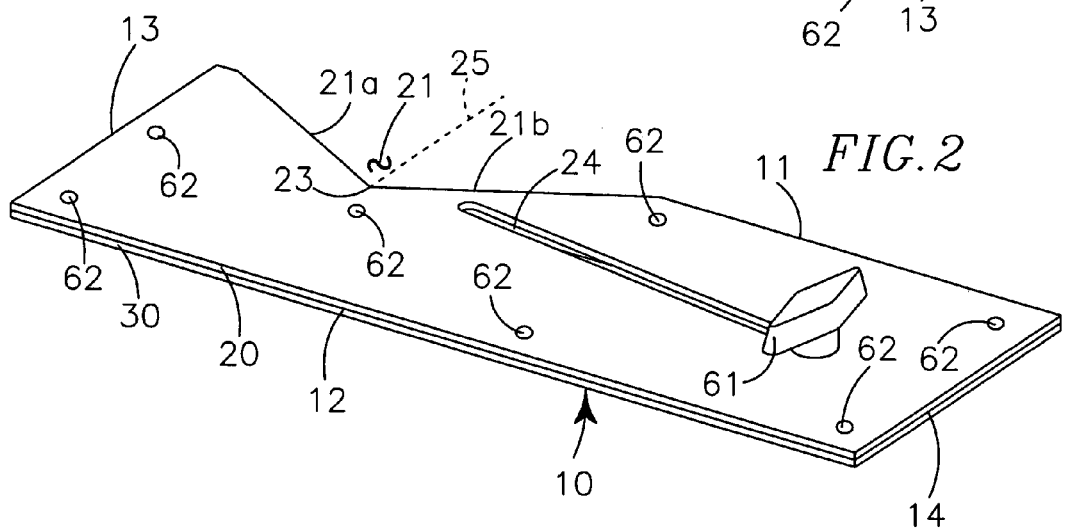
FIG. 2 is an isometric back, bottom and a second end view of the radius measuring tool of FIG. 1.

As used herein, the term "front", its derivatives, and grammatical equivalents refers to the planar portion of my radius measuring tool that is generally closest to a user. The term "back", its derivatives, and grammatical equivalents refers to the planar portion of my radius measuring tool that is generally opposite the user. The term "outer", its derivatives, and grammatical equivalents refers to an elongate end portion of the radius measuring tool as opposed to a laterally medial portion of the radius measuring tool. The term "radius" is intended in its broadest sense to be in a straight line from a center of a circular curve to the curvature thereabout.

My radius measuring tool provides a body 10 defining a V notch 21 and an angulated guide track 40 carrying a wedge 50 movable across the V notch 21.

The body 10 is preferably made of a rigid durable material, such as steel, and is generally rectilinear having an upper edge portion 11, a lower edge portion 12, a first elongate end portion 13 proximate to the V notch 21 and a second elongate end portion 14 distal from the V notch 21. The body 10 has a back plate 20 and a front plate 30 that are structurally connected to one another with plural spacedly arrayed spot welds 62.

Figure 10:
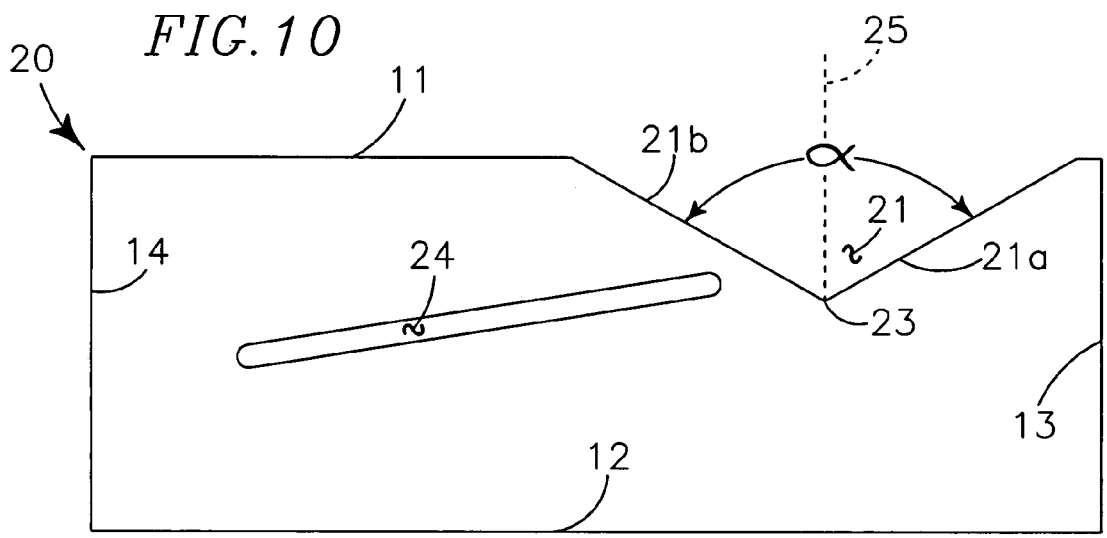
FIG. 10 is an orthographic front view of the back plate.

As shown in FIG. 10, the back plate 20 defines the V notch 21 that opens to the upper edge portion 11 spacedly adjacent the first elongate end portion 13. The V notch 21 has a first angulated edge 21a and a second angulated edge 21b that converge to intersect at apex 23. The back plate 20 also defines an elongate angulated through slot 24 that has one end portion spacedly adjacent the second angulated edge 21b and an opposing end portion spacedly adjacent the second elongate end portion 14. The V notch 21 defines an angle α that is between approximately 40 degrees and 170 degrees but is preferably 120 degrees.

Figure 9:
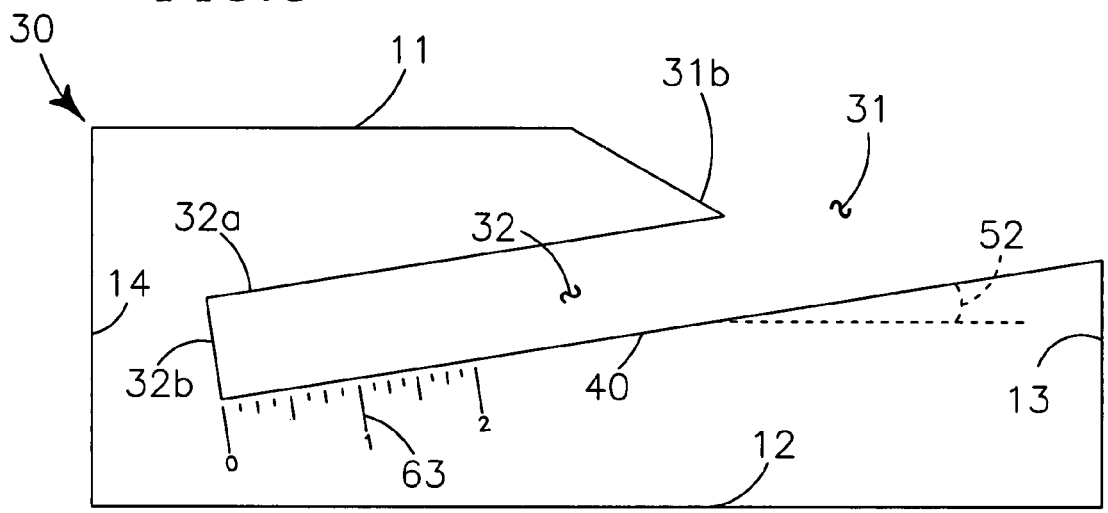
FIG. 9 is an orthographic front view of the front plate.

As shown in FIG. 9, the front plate 30 defines a "cut out" 31 at a corner portion adjoining the upper edge portion 11 and the first elongate end portion 13. An elongate rectilinear notch 32 communicates with edge 31b of the cutout 31 and extends angularly through medial portion of the front plate 30 terminating at a base 32b spacedly adjacent the second elongate end portion 14 and the lower edge portion 12. The elongate rectilinear notch 32 has upper edge portion 32a and a spaced apart parallel lower wedge track 40. Base 32b is perpendicular to the upper edge portion 32a and perpendicular to the wedge track 40.

Angle 52 of the elongate rectilinear notch 32 relative to the lower edge 12 of the body 10 and relative to an imaginary line 25 that bisects the V notch 21 is dependent upon the angle α of the V notch 21 and the desired use of the radius measuring tool. For example a tool that is used to measure smaller articles, such as hand tools, may use a one-to-one ratio between wedge 50 movement and radius measured, while a tool used to measure larger articles having radii measured in meters may use a multiple-to-one ratio between wedge 50 movement and radius measured. As angle α changes so too must the angle 52 of the rectilinear notch 32 relative to the lower edge portion 12 to maintain the desired wedge 50 movement to radius relationship.

Figure 3:
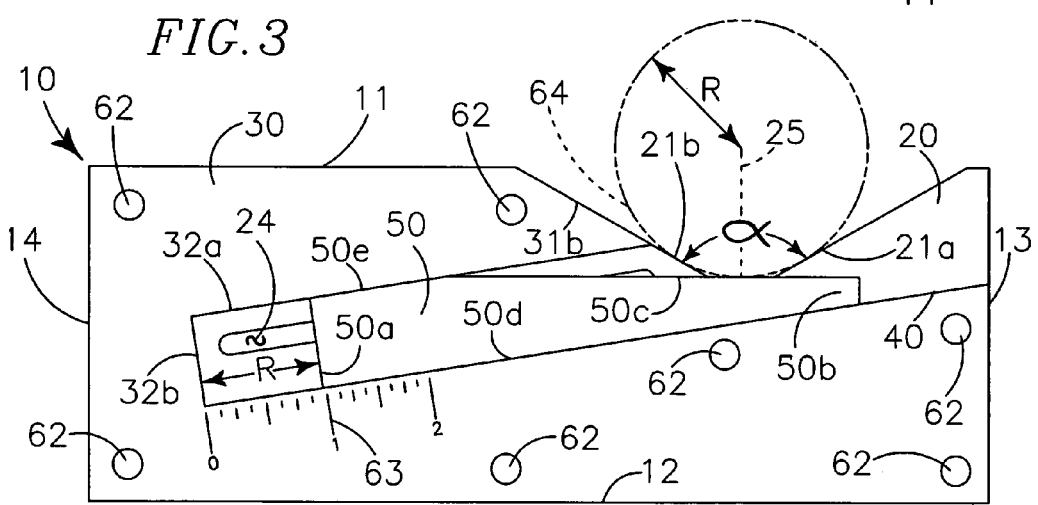
FIG. 3 is an orthographic front view of the radius measuring tool of FIG. 1 measuring the radius "r" of a circularly curved object within the V notch.

As shown in FIG. 3, the front plate 30 is aligned with, and structurally fastened to, the back plate 20 so that the upper edges 11, the lower edges 12, the second elongate end portions 14 and the first elongate end portions 13 are aligned and adjacent. The cutout portion 31 in the front plate 30 overlays the V notch 21 defined in the back plate 20, edge 31b is adjacent second angulated edge 21b and the elongated rectilinear notch 32 forms a spacedly adjacent perimeter about the elongated angulated slot 24. In the preferred embodiment, the wedge track 40 is an indented ledge in the body 10 for the wedge 50 to frictionally move therealong. (See FIGS. 1 and 3). In an alternative embodiment the wedge track 40 may protrude from the body 10 forming a "lip" upon which the wedge 50 may movably slide.

The wedge 50 (FIG. 11) has a base end portion 50a and an opposing tapered end portion 50b. A track edge portion 50d is perpendicular to the base end portion 50c and frictionally slides upon and along the wedge track 40. An anti-pivot portion 50e and measuring edge portion 50c are end-to-end and cooperatively form the upper edges of the wedge 50. The anti-pivot portion 50e is parallel to the track edge portion 50d and is adjacent to and perpendicular to the base end portion 50a. The measuring edge portion 50c is proximate to the tapered end portion 50b and angle 51 of the measuring edge portion 50c relative to the track edge portion 50d is the same as the angle 52 of the wedge track 40 relative to the lower edge portion 12 of the body 10 so that the measuring edge portion 50c is perpendicular to imaginary line 25 bisecting the angle α of the V notch 21. (FIG. 3). A threaded stud 60 (FIGS. 7 and 8) is structurally carried by the wedge 50 spacedly adjacent the base end portion 50a. The threaded stud 60 extends through the elongated slot 24 and moves therein so that the wedge 50 moves along the wedge track 40. A threaded fastener 61 carried by the threaded stud 60 maintains the wedge 50 on the wedge track 40 and allows a user to positionally secure the wedge 50 on the wedge track 40 as desired.

Measuring indicia 63 having numbered gradations beginning at zero adjacent the base 32c, to a desired maximum measurement distance and subdivided equally, is preferably engraved in the front plate 30 adjacent below the wedge track 40 so that change in position of the wedge 50 along the wedge track 40 can be measured. The base end portion 50a of the wedge 50 is the preferred fixed point of measurement, so that when the base end portion 50a is immediately adjacent the base 32b of the elongated rectilinear notch 32 the measuring indicia 63 indicates zero and the tapered end 50b of the wedge 50 is immediately adjacent the apex 23 of the V notch 21. Although this is the preferred fixed measuring point, any point along the wedge track 40 and on the wedge 50 may also be a fixed measuring point.

The geometric relationship of the angles of the V notch 21, the wedge 50 and the wedge track 40 are interdependent. The angle α of the V notch 21 may be varied depending upon the intended use of the radius measuring tool and the sought-after accuracy. In general, as the V notch 21 angle α increases and the angle 51 of the of the measuring edge 50a relative to the track edge 50d decreases, the accuracy of the radius measuring tool increases because the distance the wedge 50 must move across the V notch 21 before contacting the curve 64 being measured is increased. The increased travel distance allows more widely spaced and therefore more precise measuring indicia 63. For example a radius measuring device that is used to measure small hand tools such as sockets may use a one-to-one ratio between wedge movement and radius measured, while a radius measuring device used to measure items that have radii measured in meters may use a one-to-multiple ratio between wedge movement and radius measured.

Figure 11:
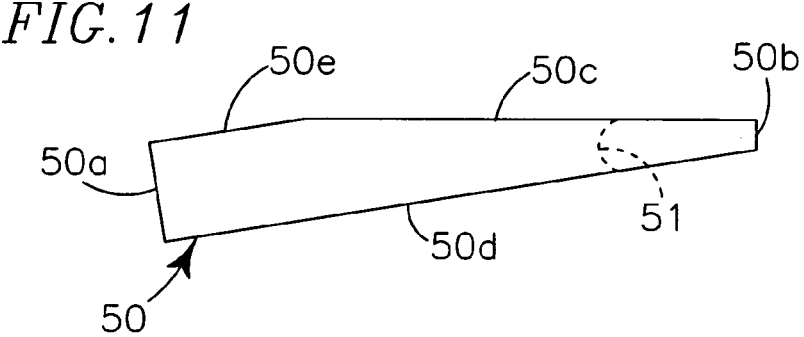
FIG. 11 is an orthographic front view of the wedge.

In the preferred embodiment, the angle α of the V notch 21 is 120°, and the angle 51 of the measuring edge portion 50a relative to the track edge portion 50d of the wedge 50 is approximately 8.8994 degrees. (FIG. 11). The angle 52 of the guide track 40 relative to the lower edge 12 of the body 10 is similarly approximately 8.8994 degrees. (FIG. 9). These preferred angle measurements provide a one-to-one ratio between the movement of the wedge 50 and the radius of the curve 64 being measured.

The measuring edge portion 50a of the wedge 50 moves across the V notch 21 perpendicular to the imaginary line 25 that bisects the V notch 21 (FIG. 3). This perpendicular intersection necessitates that the angle 52 of the wedge track 40, relative to the lower edge 12 of the body 10 is the same as the angle 51 of the of the measuring edge 50a relative to the track edge portion 50d of the wedge 50, so that in unison, the two angles 52, and 51 form a straight horizontal line.

Figure 12:
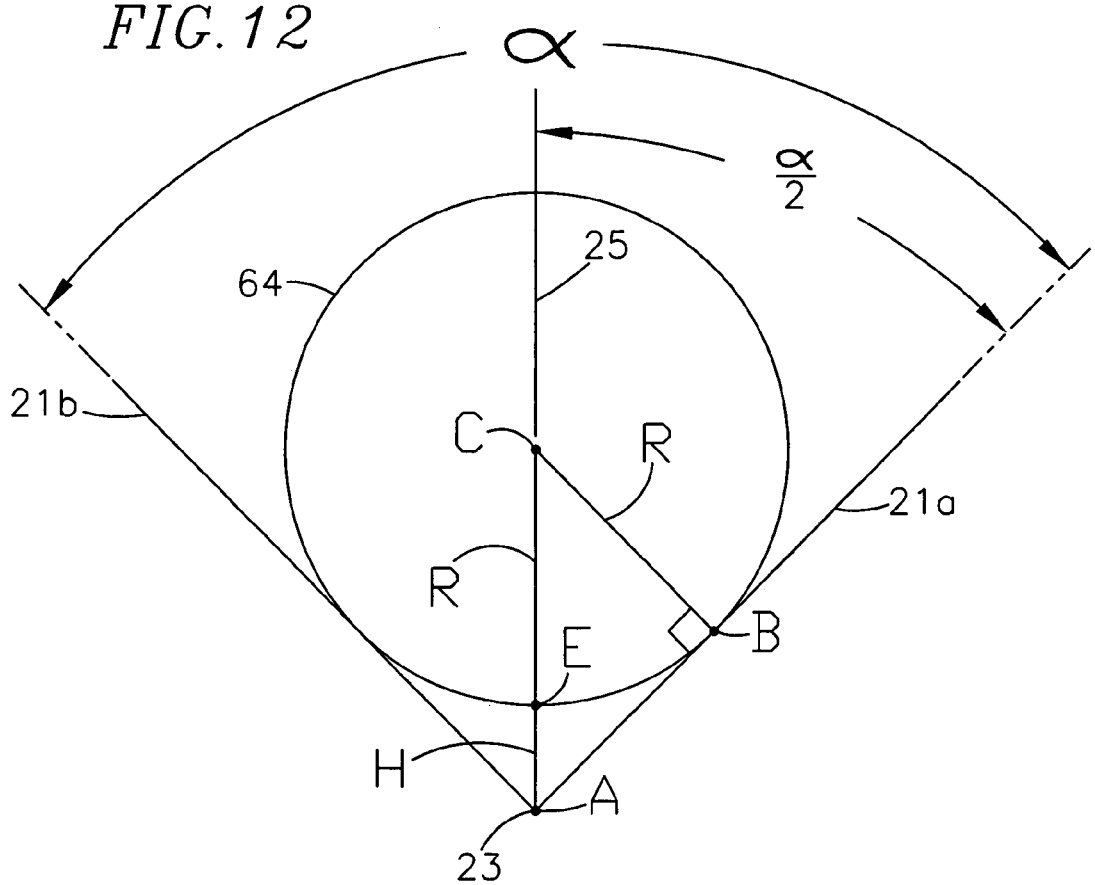
FIG. 12 is a diagrammatic illustration of a curve being measured in the V notch having angle α and right triangle ABC that is used to calculate distance H which is a function of R.

As shown in FIG. 12, α is the angle between the first angulated edge 21a and the second angulated edge 21b. R is the radius of the circular curve 64 and is equal to leg CB of right triangle ABC. AB is the adjacent leg of the right triangle ABC where angle CAB is α/2. In the preferred embodiment angle α is 120 degrees meaning angle CAB is 60 degrees, and angle ACB is 30 degrees. H is the distance between the apex 23 and point E which is the lowest portion of the circular curve 64. Hypotenuse AC of triangle ABC is equal to R+H.

Radius R of the circular curve 64 is determined using the following equation:

$$R=(R+H)\sin \alpha/2$$

H which is the distance between the apex 23 (point A) and point E is determined using the following equation:

$$H=R[1/\sin(\alpha/2)-1]$$

Values for R and for H are not required to calculate the needed angle 51 (FIG. 11) of the measuring edge 50c of the wedge 50 and the angle 52 (FIG. 9) of the wedge track 40 to generate a one-to-one relationship between wedge 50 movement and radius measured.

Figure 13:
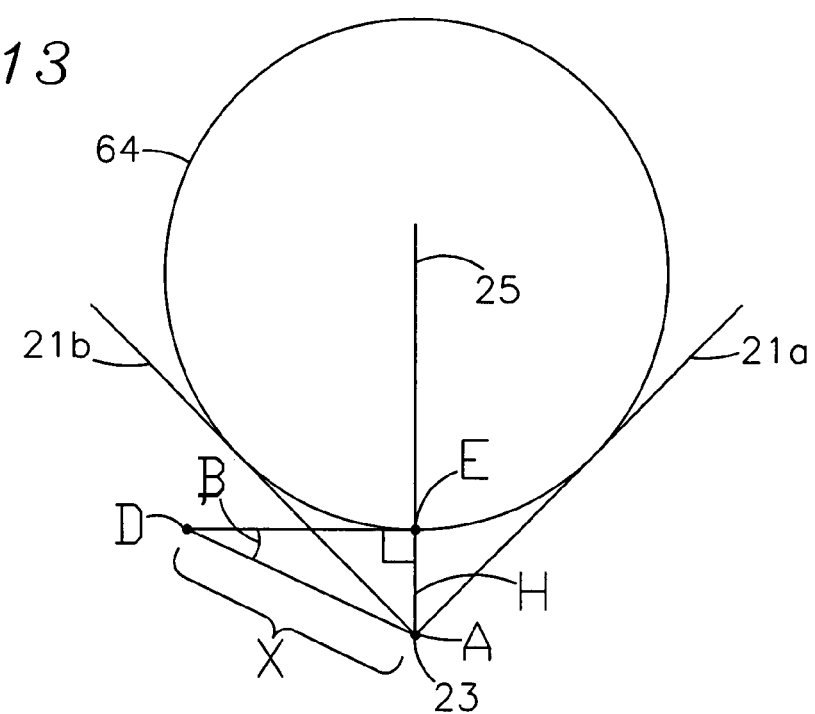
FIG. 13 is a diagrammatic illustration of right triangle DEA, angle β and triangle legs to calculate the lateral movement of the wedge to create the desired relationship between the radius of the circular curve and movement of the wedge.

As shown in FIG. 13, right triangle DEA represents the portion of the wedge 50 that has crossed the bisector 25 of the V notch 21 when the measuring edge portion 50c of the wedge 50 contacts the curve 64 at point E which is the lowest portion of the circular curve 64. X is the hypotenuse AD of the right triangle DEA and represents the positional change of the wedge 50 on the wedge track 40 away from the base 32b. (FIG. 3). H is side AE of the right triangle DEA and as previously indicated $H=R[1/\sin(\alpha/2)-1]$. Angle EDA is represented by β. It follows that:

$$X \sin\beta = R[1/\sin(\alpha/2)-1]$$

In the desired case where X=R the following equation provides the calculation to determine β for a one-to-one relationship between wedge 50 movement and radius R:

$$\sin\beta=[1/\sin(\alpha/2)-1]$$

Upon solving, $\beta=(\sin^{-1})[1/\sin(\alpha/2)-1]$. Where $\alpha/2=60$ degrees, the following solution is provided:

$$\beta=(\sin^{-1})[1/0.8660254-1].\beta \approx 8.8994 \text{ degrees}.$$

Similar calculations can be made for other angles α which also provide a one-to-one relationship between the radius R of the circular curve 64 and the movement of the wedge 50. For example, a V notch 21 defining an angle α of 90 degrees requires a β angle of approximately 24.4698 degrees. A V notch 21 defining an angle α of 150 degrees requires a β angle of approximately 2.0216 degrees. A V notch 21 defining the ratio of R/X=10 has an angle α of 130.76004 degrees requires a β angle of approximately 5.7392 degrees. Other α angles can likewise be associated with corresponding β angles based upon the desired ratio between R and X.

Having described the structure of my radius measuring tool, its operation may be understood.

To measure the radius R of a curve, the wedge 50 is moved to its extreme limit distal from the V notch 21 so that the base end portion 50a is immediately adjacent the base 32b of the elongate rectilinear notch 32. This position is known as the "zero" position where the tapered end portion 50b of the wedge 50 is immediately adjacent the apex 23 of the V notch 21. The circular curve 64 to be measured is positioned in the V notch 21 so that the circumferential surfaces of the circular curve 64 simultaneously contacts the first angulated edge 21a and the second angulated edge 21b on either side of the apex 23. (See FIG. 3). To obtain optimal accuracy in measuring the radius, the body 10 must be perpendicular to the axis of the circular curve 64. The wedge 50 is moved along the wedge track 40 and across apex 23 until the measuring edge portion 50c touches the bottom most portion of the circular curve 64 within the V notch 21.

The threaded fastener 61 on the threaded stud 60 is tightened to secure the wedge 50 in this position, or the user may hold the wedge 50 in this position.

The user compares the base end portion 50a of the wedge 50 with the measuring indicia 63 engraved in the front plate 30. The distance shown by the measuring indicia 63 is the radius of the circular curve 64. Alternatively, a known type of measuring caliper (not shown) may be used to measure the distance between the base end portion 50a of the wedge 50 and the base 32b of the rectilinear notch 32. The distance between the base portion 50a and base 32b of the rectilinear notch 32 is the radius of the curve 64.

In an alternative embodiment (not shown) the radius measuring tool will incorporate a mechanical or electrical measuring apparatus that is interconnected to the wedge 50 and the body 10 that automatically calculates the travel of the wedge 50 along the wedge track 40 to provide the measurement to the user.

Having thusly described my invention, what I desire to protect by Letters Patent, and

What I claim is:

1. A tool for measuring the radius of an object having a circularly curved surface, the tool comprising in combination:
   a rectilinear body having a front plate and a structurally interconnected back plate,
      the back plate defining a V notch having a fixed angle formed by two converging linear sides that intersect at an apex for simultaneously contacting a first point and a second point along the circumference of the circular curve, and an angulated through slot having one end portion proximate to the apex and an opposing end portion distal from the apex, and
      the front plate defining a cut out area exposing the V notch and defining an elongated rectilinear notch having one end portion communicating with one linear side of the V notch, an opposing base end portion distal from the V notch, an upper edge and a spaced apart parallel wedge track, the upper edge and the wedge track angulated relative to a bisector of the V notch other than perpendicularly;
   a wedge having a base end portion, an opposing tapered end portion, an upper measuring edge portion and a track edge portion, the wedge movable along the wedge track on the track portion and across the bisector so that the measuring edge portion contacts the circumference of the circular curve between the first and second points;
   measuring indicia on the body to determine travel distance of the wedge along the wedge track; and
   distance of positional change of the wedge along the wedge track correlates to the radius of the circular curve.

2. A tool for measuring the radius of an object having a circularly curved surface, the tool comprising in combination:
   a body defining a V notch formed by two converging linear sides for simultaneously contacting a first point and a second point on the circumference of the circular curve, the V notch having an apex and forming an angle $\alpha$;
   a wedge having a measuring edge that is perpendicular to a bisector of the angle $\alpha$, the wedge movable on a wedge track across the bisector so that the measuring edge contacts the circular curve at the bisector between the first and second points;
   the circular curved surface within the V notch has a center C and a radius R;
   a right triangle is formed by the center C, a first point B where one side of the V notch contacts the circular curve and point A which is the apex of the V notch;
   hypotenuse AC of the right triangle ABC is equal to the radius R plus distance H which is the distance between the apex A and point E along the bisector;
   determining H based upon the trigonometric equation $H=R[1/\text{sine}(\alpha/2)-1]$ a second right triangle DEA that represents the portion of the wedge that has crossed the bisector when the wedge contacts the circular curve wherein X equals hypotenuse DA of the right triangle DEA and also represents the change in position of the wedge along the wedge track, and H represents side EA of the right triangle DEA which is also equal to $H=R[1/\text{sine}(\alpha/2)-1]$, and angle EDA is represented by $\beta$;
   determining the desired ratio between the radius R of the circular curve and the distance X the wedge moves on the wedge track; and determining angle $\beta$ using the trigonometric equation $R/X=\text{Sine}\beta/[1/\text{sine}(\alpha/2)-1]$.

* * * * *